United States Patent [19]

Chao

[11] Patent Number: 5,915,097
[45] Date of Patent: Jun. 22, 1999

[54] METHOD AND APPARATUS FOR DATA STORAGE AND SEARCH IN AN ADDRESS TABLE OF AN ETHERNET SWITCH

[75] Inventor: Rui-Fu Chao, Hsinchu, Taiwan

[73] Assignee: Winbond Electronics Corporation, Taiwan

[21] Appl. No.: 08/709,492

[22] Filed: Sep. 6, 1996

[30] Foreign Application Priority Data

Aug. 14, 1996 [TW] Taiwan .................................. 85109875

[51] Int. Cl.⁶ .................................................. G06F 15/16
[52] U.S. Cl. .................................... 395/200.68; 395/200.6
[58] Field of Search ......................... 395/200.68, 200.74, 395/200.66, 200.6

[56] References Cited

U.S. PATENT DOCUMENTS

| | | | |
|---|---|---|---|
| 4,627,052 | 12/1986 | Hoare et al. | 370/88 |
| 5,490,252 | 2/1996 | Macera et al. | 395/200.01 |
| 5,521,913 | 5/1996 | Gridley | 370/58.2 |
| 5,598,410 | 1/1997 | Stone | 370/469 |
| 5,732,041 | 3/1998 | Joffe | 365/230.05 |

OTHER PUBLICATIONS

Socolopsky et al, "A TCP/1P Tutomal," Spider Systems Limited, RFC 1180, Jan. 1991 pp. 1–28.

Reynolds et al, "Assigned Numbers," Network Working Group, RFC 1060, Mar. 1990, pp. 1– .

Douglas Comer, "Internetworking with TCP/1P," Prentice Hall, Second Edition, 1991, pp. 109–121.

"Configuring Internet Protocol (1P) Routing," Santa Cruz Operation Electronic Books, Chapter 11, May 1995, pp. 1–47.

*Primary Examiner*—Mehmet B. Geckil
*Attorney, Agent, or Firm*—Rabin & Champagne, P.C.

[57] ABSTRACT

A method and apparatus for storing data and searching in the address table of an Ethernet switch device. The Ethernet switch device includes a central switch and a number of device port connectors which each have a port, a router, an address table, and a media access controller. The router includes a destination address register and a multiplexer. The destination address register receives network addressing information from the media access controller and divides it into a number of address sections. The multiplexer receives the address sections from the register for successively multiplexing the sections into multiplexed address outputs. The multiplexed address outputs are compared with entries stored in the address table to find a match with address information contained in the entries. The central switch connects to the port of the device port connector identified by a port number contained in the network addressing information corresponding to the match. The central switch broadcasts the network addressing information to all ports of all of the device port connectors if the comparison generates no match.

17 Claims, 4 Drawing Sheets

METHOD AND APPARATUS FOR DATA STORAGE AND SEARCH IN AN ADDRESS TABLE OF AN ETHERNET SWITCH

BACKGROUND OF THE INVENTION

1. Field of the Invention

The invention relates in general to an Ethernet switching method and an apparatus for networked communication. In particular, the invention relates to a method and an apparatus for data storage in and search of an address table of an Ethernet switch for computer networks.

2. Description of the Related Art

An Ethernet switch can be considered to be a type of active hub device used for transceiving networking data in an Ethernet-based computer networking environment. According to the Ethernet protocol, 48 bits of memory space is assigned for specifying each set of processed network addressing information. For each set of network addressing information processed, 48 bits out of the 64-bit network addressing word stored in an address table is taken up by the network address.

In addition to the 48-bit network address, the Ethernet standard generally specifics a port number, an age parameter, and a set of control bits for each of the processed 64-bit network addressing words, totaling 16 of the 64 bits in the information word. As is well known in the art, the port number identifies the particular one of the multiple ports of an Ethernet switch device to which the particular network data is destined, while the age parameter and control bits implement the substantial network data word transmission to and reception from its identified destination.

For the purpose of describing the method and apparatus of the invention for data storage and search in an address table of an Ethernet switching device, the block diagram of FIG. 1, showing the structural configuration of a typical Ethernet switching device, is briefly examined.

As shown in the drawing, the Ethernet switching device includes a total of four ports identified as PORT#0, PORT#1, PORT#2 and PORT#3. These ports are utilized to connect to a maximum of four network nodes in one or more Ethernet networks. Such connections are made for implementing data transceiving between every selected pair of the network nodes connected. As persons skilled in the art can well appreciate, the total number of ports provided in an Ethernet switching device, such as the device depicted in FIG. 1, is not necessarily limited to four. More than four ports may be provided in practical applications in a normal networking environment. Further, each of the connected network node devices, either a computer system or other peripheral device (such as a printer), may not necessarily be in the same physical network as any other node device that is also tied to the very Ethernet switching device.

The exemplified Ethernet switching device of FIG. 1 includes four subsystems 1, 2, 3 and 4, each for the corresponding one of the four ports. Each subsystem includes a set of logic, for example, subsystem 1 includes a media access controller (MAC) 12, a routing means 14, and an address table 16. The Ethernet switching device further includes a switch means 5 topologically located at the center of the device that facilitates the switching of information between any two of the network nodes which may be connected to any two of the four ports PORT#0–PORT#3. Essentially, the media access controller MAC 12 is responsible for implementing the transmission and reception of the network data to and from the port connected thereto. The routing means 14, on the other hand, is used to provide the necessary control signals to the switch means 5 for determining to which of the four ports the data should be sent. The address table 16 is utilized to hold the information needed by the routing means 14.

Referring to FIG. 2 of the drawing, there is shown a block diagram schematically illustrating the interaction between the routing means 14 and the address table 16 of an Ethernet switching device. The routing means 14 generally comprises a destination address register (DA Reg.) 142, a hash means 144, and a control means 146. The DA register 142 is a 48-bit memory device that receives and holds the destination address of the processed network data as provided by the MAC 12 of FIG. 1. The destination address is relayed to the hash means 144 for producing a 12-bit address that is compared with entries in the address table 16.

The hash means 144 is a logic means that implements a sort of compression scheme by chopping off portions of the 48-bit destination address of the processed network data. This hashing effectively reduces the size of the 48-bit destination address to a representative 12-bit address. Based on this reduced-size address information, one single corresponding 64-bit set of data can be located in the address table 16, which comprises a total of, for example, 4K (4096) entries of network address information. The corresponding located entry of 64-bit network address information can then be relayed back to the routing means 14 and processed by the control means 146 for its output to the switching means 5 of FIG. 1.

Each set of the 64-bit network address information held in the address table 16, based on the Ethernet standard, comprises a data format such as is shown in FIG. 3. Essentially, in addition to the 48-bit network address field NET_ADDR, there are a network processing control information field CONTROL, an age information field AGE, and a port number field PORT_NO. These three information fields together take up 16 bits of the 64-bit network address information comprising the network information as depicted in the drawing.

Therefore, the 64-bit network address information entry, as retrieved from the address table 16 based on the hashed 12-bit address, comprises a total of four fields, CONTROL, AGE, PORT_NO and NET_ADDR. Thus, its network address field NET_ADDR constitutes the single correspondence with the original 48-bit destination address as issued by the MAC 12 of FIG. 1. This network address information retrieval from the address table 16, utilizing the hashed 12-bit address, is based on the implementation of a comparison operation. The comparison is performed by comparing the 12-bit hashed address with the network address field NET_ADDR of the entries in the address table 16.

When one and only one match is produced as the result of the comparison, the corresponding 64-bit network address information can be elected and treated as the information mapped by the destination address information held in the DA register 142. The other parameters contained in the other three information fields of this matched data entry, CONTROL, AGE and PORT_NO, can be used as the information for carrying out the network data routing. For example, the port number information PORT_NO can be used to determine which of the four connection ports of the device of FIG. 1 should be elected to relay the network data. As can be observed in the drawing of FIG. 2, this is done by the control means 146 of the routing means 14, which relays the elected 64-bit network address information directly to the switch means 5 of FIG. 1.

If, however, no conformity is found between any entry of the 4K 64-bit address table 16 and the hashed 12-bit address as issued by the hash means 144, a determination is made that there is no network address having a connection tie with the current Ethernet switching device. In this case, the processed network data is broadcast to every one of the connection ports of the switching device.

Thus, in accordance with the Ethernet standard, in an Ethernet switching device employed as, for example, an active hub device for a networking environment, each set of the processed network addressing information takes up a total of 48 bits of memory space. For each network addressing word processed in the network environment, these 48 bits form a considerably large portion of the 64-bit word. This requires that the memory space for the other network processing parameters to be relatively small, and makes performance by the system of more advanced and complex network operations more difficult.

SUMMARY OF THE INVENTION

It is therefore an object of the invention to provide a method and an apparatus for data storage and search in an address table of an Ethernet switch, that has a reduced memory space requirement for network addressing information.

It is another object of the invention to provide a method and an apparatus for data storage and search in an address table of an Ethernet switch, that provides relatively more memory space for storing network control parameters other than the network address information.

It is still another object of the invention to provide a method and an apparatus for data storage and search in an address table of an Ethernet switch, that allows for the performance of more advanced and complex networking functions.

The invention achieves the above-identified objects by providing a method of storing data and searching in the address tables of the Ethernet switch device. The Ethernet switch device includes a central switch means and a number of device port connection means, each comprising a routing means, an address table, and a media access control means. The routing means further includes a destination address register and a multiplexer means. The method includes steps whereby the destination address register receives network addressing information from the media access control means and divides it into a number of address sections. The multiplexer means receives the address sections from the address register and successively multiplexes them to provide multiplexed address outputs. The multiplexed address outputs are compared with entries in the address table for a match with address information contained in the entries. The central switch means connects to a port of one of the device port connection means identified by port number contained in the network addressing information for the match. The central switch means broadcasts the network addressing information to all ports of all of the device port connection means if the comparison generates no matches.

The invention further achieves the above-identified objects by providing an Ethernet switch device which includes a central switch means and a number of device port connection means connected to the central switch means. Each of the device port connection means includes a routing means, an address table, and a media access control means. The Ethernet switch device performs data storage and conducts a search in the address table, for determining connection of the central switch means to a port corresponding to one of the device port connection means identified by port number contained in the network addressing information matched in a comparison operation.

BRIEF DESCRIPTION OF THE DRAWING

Preferred embodiments of the invention are described in detail below, with reference to the accompanying drawings, wherein.

DETAILED DESCRIPTION OF THE PREFERRED EMBODIMENTS

Figure 2:
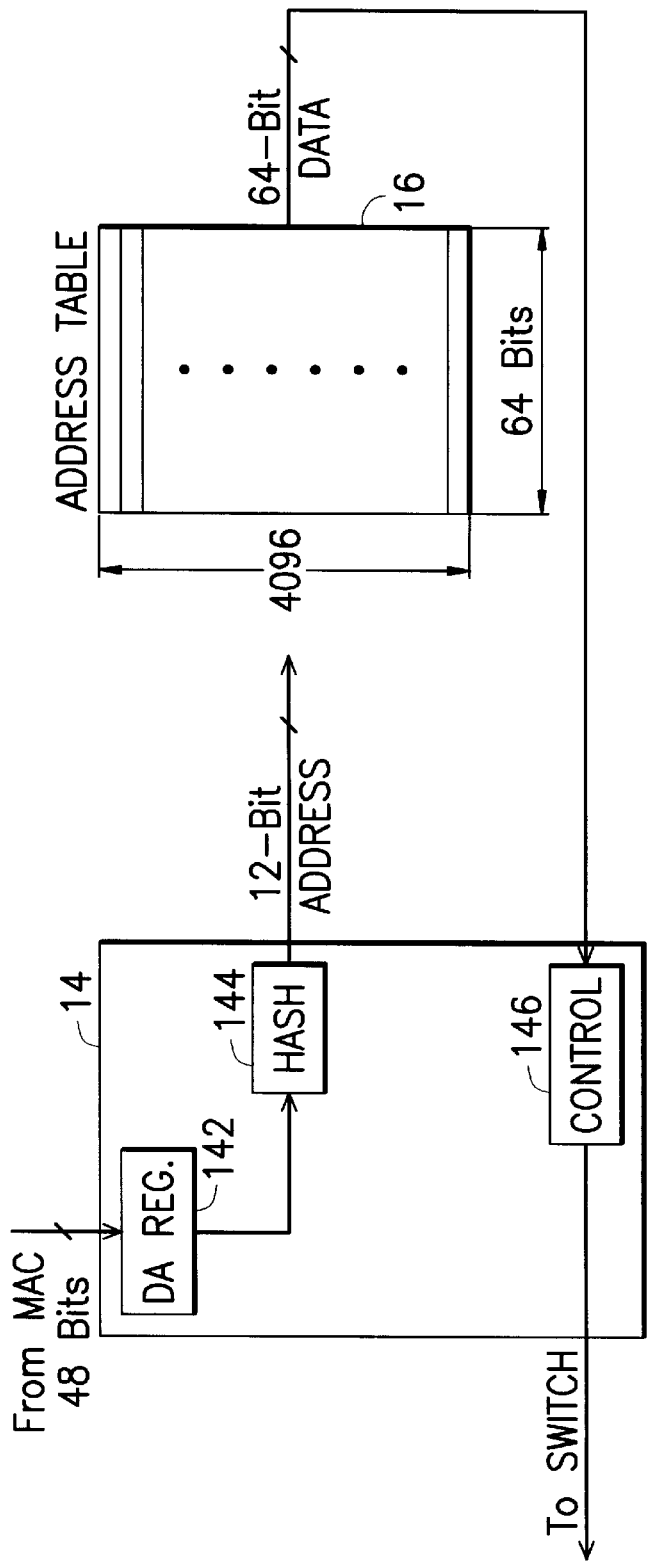
FIG. 2 is a block diagram schematically showing the interaction between a routing means and an address table of an Ethernet switch device.
Figure 3:
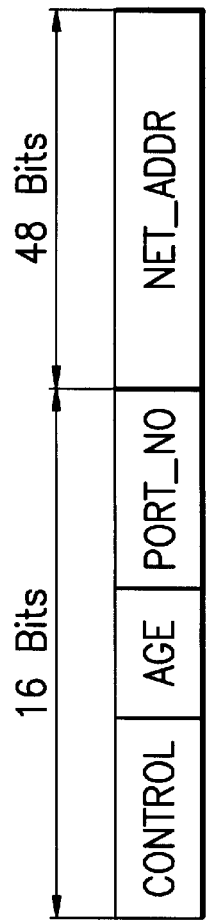
FIG. 3 schematically outlines the format of an entry of a typical Ethernet addressing word held in an address table.
Figure 4:
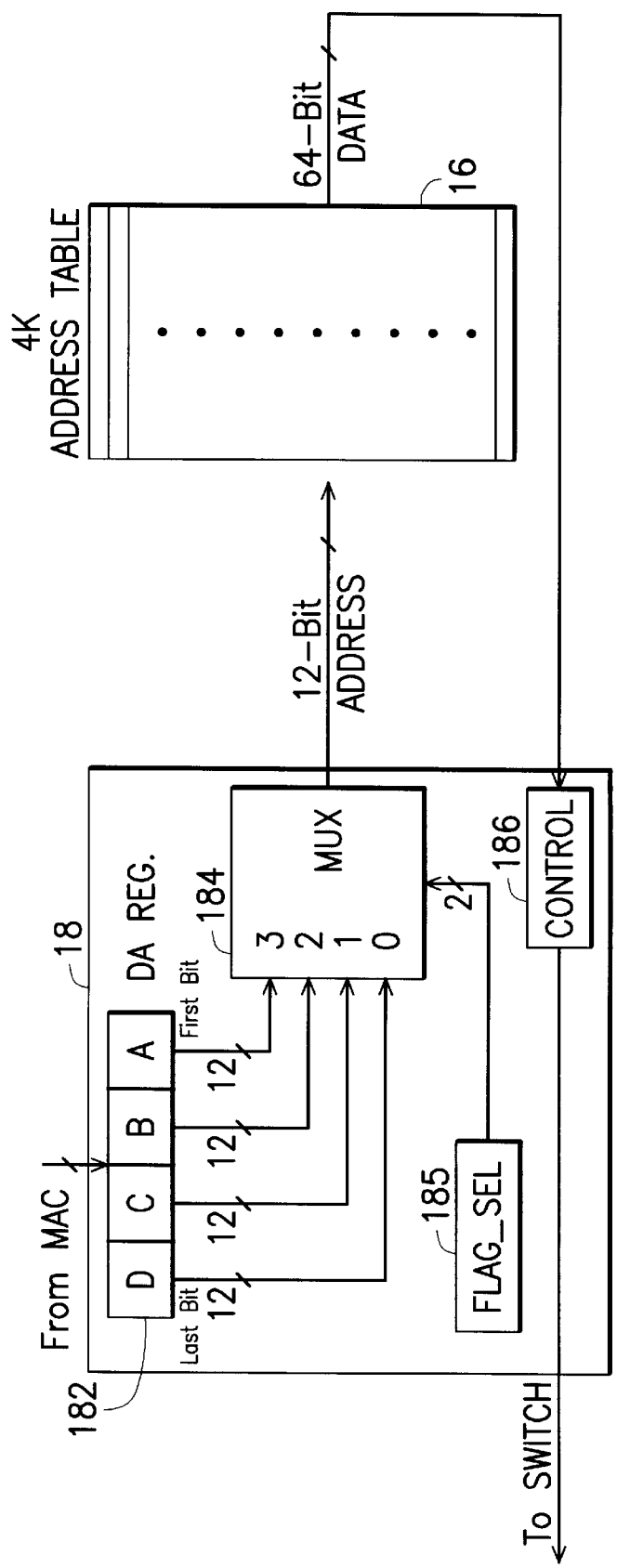
FIG. 4 is a block diagram schematically showing the interaction between a router and an address table of the Ethernet switch device while the device is implementing the method accord to a preferred embodiment of the invention.

For a description of the method and apparatus for data storage and search in an address table of an Ethernet switch, based on the understanding of the structural configuration and operation of a typical Ethernet switch device as examined above, reference is directed to FIG. 4 of the drawing. FIG. 4 is a block diagram schematically showing the interaction between a router 18 and an address table 16 of the Ethernet switch device implementing the method according to the invention. Note that upon comparison with FIG. 2, the router 18 of the inventive method and apparatus employs a multiplexer MUX 184 in place of the hash means 144 in the routing means 14 of the conventional Ethernet switch device (FIG. 2).

As shown in FIG. 4, the router 18 used for the invention generally comprises a destination address register (DA Reg.) 182, a multiplexer 184, and a controller 186. The DA register 182 is a 48-bit memory device that receives and holds the destination address of the processed network data as provided by the MAC 12 of FIG. 1. Similar to the case of the conventional routing means 14 described above, the destination address is relayed to the multiplexer 184 for producing a 12-bit address that is compared with entries in the address table 16. However, it must be pointed out that the destination address register 182 of the invention has a data format, outlined in FIG. 5, that is different from the standard Ethernet.

Figure 5:
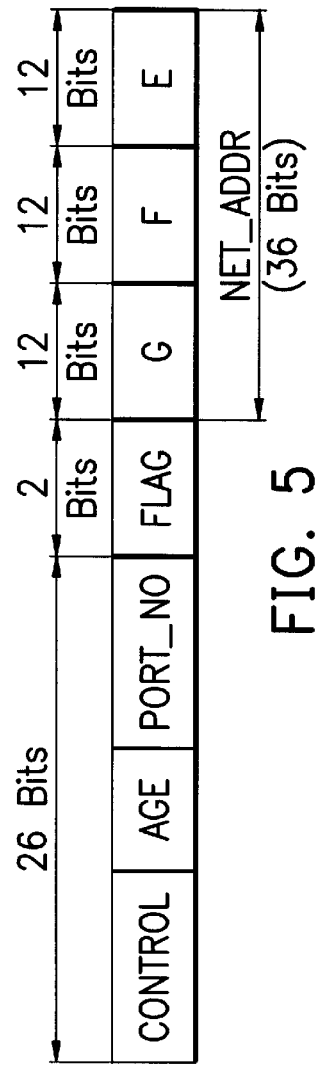
FIG. 5 schematically outlines the format of an Ethernet addressing word stored in an address table suitable for implementing the method according to the preferred embodiment the present invention.

As is schematically outlined in FIG. 5, the format of an Ethernet addressing word in the address table 16 of FIG. 4 suitable for implementing the method in accordance with the invention also comprises a total of 64 bits. In essence, the 64-bit network addressing information comprises a 36-bit address section NET_ADDR that is divided into three blocks identified by blocks E, F and G, respectively. An additional two bits of flag-select information identified by FLAG, adds to the 36 bits of address information to provide network addressing information having a total length of 38 bits.

In addition to this 38 bits of network address information, each set of the 64-bit network addressing information in the address table 16 has an additional 26 bits, an increase of 10 bits over that of the conventional Ethernet standard, for the three other fields of necessary network control information, including the control information field CONTROL, the age information field AGE, and the connection port number field PORT_NO. A total of 5 information fields are now arranged in this new 64-bit network addressing information data format, if the flag-select information FLAG is treated as a field. Thus, the network data routing control information can include more controlling details for more complicated network controlling functionality.

Figure 1:
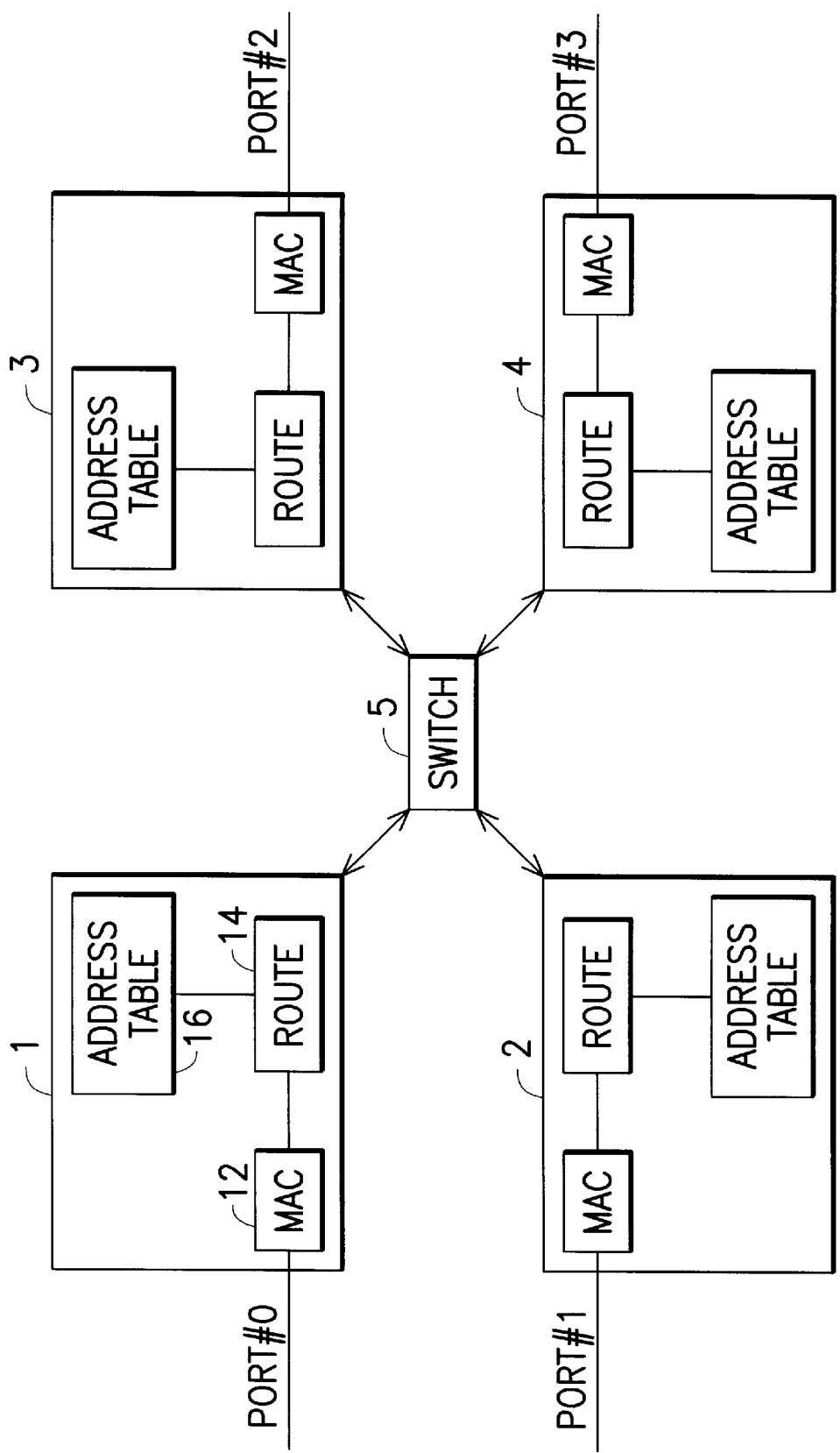
FIG. 1 is a block diagram showing the structural configuration of a typical Ethernet switch device.

On the other hand, the destination address register 182 for the routing means 18 of the preferred embodiment of the invention is arranged to have a configuration of four 12-bit address fields, identified as fields A, B, C and D respectively, as is shown in FIG. 4. The 48-bit destination address information as provided by the MAC 12 of FIG. 1 is stored in this register comprising the four address fields.

As is also schematically shown in FIG. 4, the multiplexer 184 is basically a four-to-one multiplexing device that is arranged to multiplex to provide as its output one of the four 12-bit address fields A, B, C and D of the destination address in the DA register 182. The output of the multiplexer 184 is used as the 12-bit address for comparative searching in the address table 16 to locate the destined network target. The multiplexing operation of the means 184 is controlled by the two bits of flag-select information FLAG.

In the embodiment as outlined above for the apparatus of the invention, although it is described to have an associated respective address table for each of the four network-connected ports, however, these address tables may substantially be the same address table containing all the necessary networking address information. In other words, as persons skilled in the art are well aware, networking address information for all the connection ports may be contained in one single address table implemented in a memory device that can be referenced by each of the requesting ports. This is obvious as all the network nodes connected to the inventive device would be in the same network that share the same information database. Further, the routing means used in each of the subsystems for each connected port can be the same one that is utilized in a time-multiplexed manner. This is again possible as there is only one port connected via the inventive apparatus at any one time. All these concepts of shared physical address table and routing means may contribute to system simplification when the invention is substantially implemented.

Figure 6:
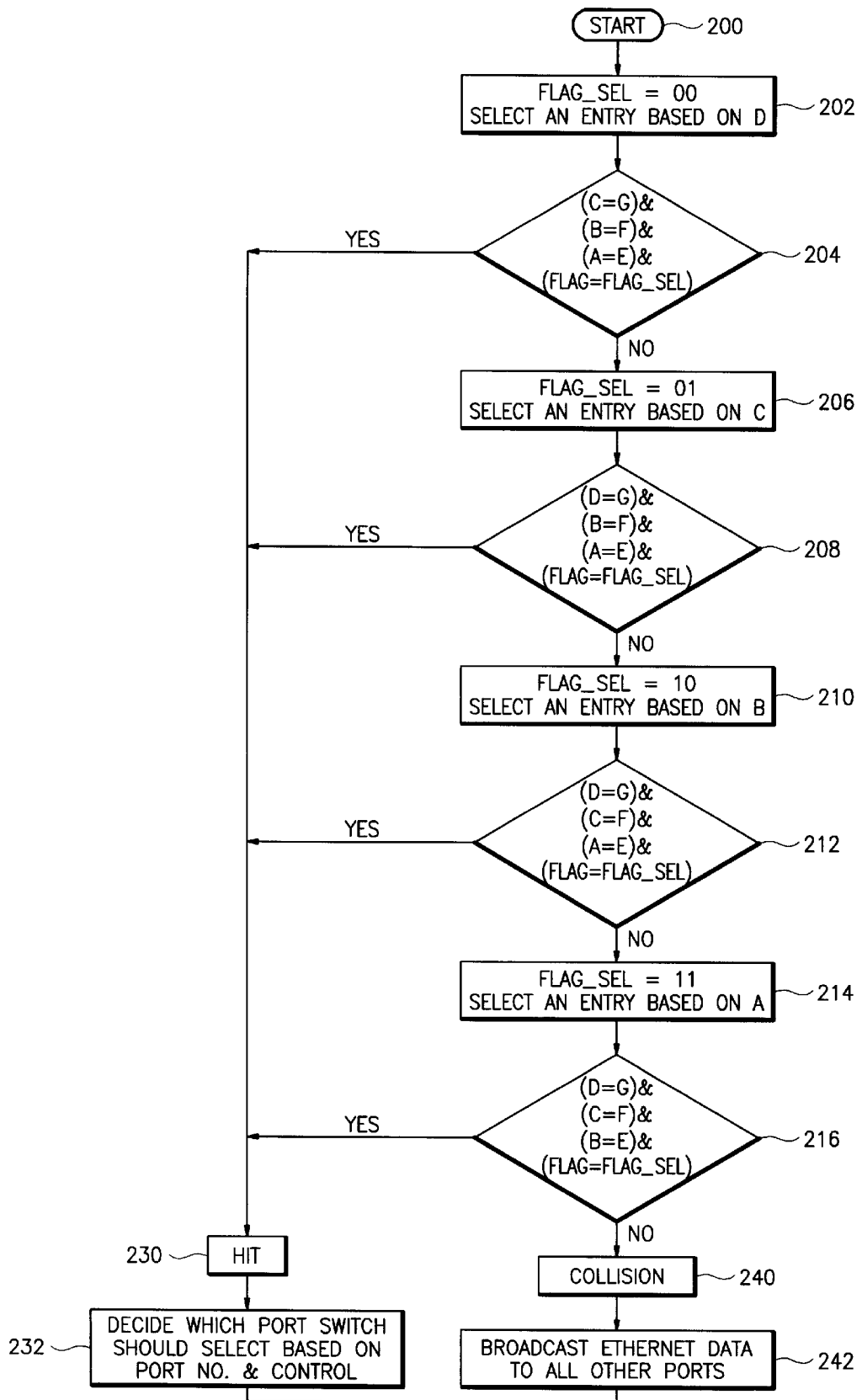
FIG. 6 is a flow chart showing a scheme for controlling the hardware, that implements the method in accordance with the preferred embodiment of the invention.

The controlling scheme for the hardware router means 18 of FIG. 4 that implements the method in accordance with the preferred embodiment of the invention, is shown in the flow chart of FIG. 6.

As is shown in the flow chart of FIG. 6, the scheme for controlling network addressing follows a start step 200 by first setting a two-bit index FLAG_SEL to the value of binary 00 in step 202. This setting of the index FLAG_SEL value allows the multiplexer 184 of FIG. 4 to select the 12-bit address field D as its multiplexed output for subsequent comparison to the entries in the address table 16 in the following step 204. When the scheme proceeds to step 204 for implementing the comparison in an effort to locate the corresponding matched entry in the address table 16, the standard of comparison is set to the conditions as outlined in step 204 of the flow chart.

Essentially, based on the hardware configuration of the described embodiment depicted in FIGS. 1 and 4, and the format of Ethernet addressing word shown in FIG. 5, finding a match in step 204 requires the simultaneous fulfillment of the conditions C=G, B=F, A=E, and FLAG=FLAG_SEL. Specifically, this means that the 12-bit C address field relayed by the MAC 12 of FIG. 1 and contained in the DA register 182, has a content that equals the 12-bit G address field held in a corresponding entry in the address table 16, the B address field in DA register 182 equals the F address field in the same entry of the address table 16, the A address field in DA register 182 equals the E address field in the same entry of table 16, and, the two-bit FLAG field in the DA register 182 equals the set index FLAG_SEL.

If the conditions of this multiple-condition testing step 204 are met, the controlling scheme of FIG. 6 proceeds to step 230, indicating a comparison match has resulted, and then proceeds to step 232. In step 232, a port switch (connection port) of the Ethernet switch of FIG. 1, to which the networking data word currently being processed by the system should be switched, as identified by the port information field PORT_NO, is determined. The connection to the port may be implemented based on the specified control information CONTROL contained in the correspondingly located entry of the address table 16. Afterwards, the controlling scheme can be concluded at step 250.

If, however, the conditions of the testing step 204 are not met, the controlling scheme proceeds to step 206 to set the FLAG_SEL to a new index value 01. Similarly to the case of step 204, based on this newly set index value, the multiplexer 184 selects the 12-bit address field C in the DA register 182 for the next comparison trial. Again, to locate a successfully matched entry in the address table 16 of FIG. 4, conditions D=G, B=F, A=E, and FLAG=FLAG_SEL must be fulfilled simultaneously. If the test conditions of step 208 are met, an entry in the address table 16 is identified, the port connection is effected in step 232, and the procedure concludes at step 250. Otherwise, the scheme proceeds to step 210 for testing of another set of conditions.

If after the last testing step 216 of the controlling scheme is performed, and the test conditions continue not to be fully met, then a collision condition arises in the requested network addressing operation. This is signified in step 240 by setting up of a conflict flag. The system then proceeds to perform an all-out broadcasting operation in step 242, and relays the networking data word to all the network nodes connected behind all of the connection ports of the Ethernet switch device. Afterwards, the scheme concludes at step 250.

Thus, the method and apparatus for data storage and search in the address table of an Ethernet switch device, is capable of preserving considerable memory space for necessary address information involved in the networking operations. In an embodiment of the invention wherein the address table is arranged to have an addressing space of N bits, a total of M address bits are required to hold the network addressing information wherein the relation between M and N are expressed in the equation $$M = \log_2 (48/N) + (48-N).$$

For example, in an example wherein N is 12, $$M = \log_2 (48/12) + (48-12)$$

$$= 2 + 36$$

$$= 38 < 48.$$

This means that with the use of the method and apparatus of the invention, if an address space of 12 bits is used, then a total of only 38 bits, not the 48 bits in the Ethernet standard, would be required to be used to implement the same network addressing capability as that of the conventional systems. This is a saving of 10-bit memory space from the storage requirement of each entry of the addressing information. In the entire addressing space, this 10-bit reduction in storage for addressing information can be translated into a significant memory space saving of $2^{12} \times 10$ bits=40K bits. The preserved 10 bits can now be assigned for the use of the other network controlling parameters, so that more complicated and advanced networking functionality can be implemented without the need of additional memory resources.

Thus, as persons skilled in this art will well appreciate, the above description of the preferred embodiment of the invention is intended to describe, not to limit the invention. Modifications to the outlined embodiment of the invention will be apparent and should be considered to be within the scope of the invention that is recited in the appended claims. For example, although an Ethernet switch device having four connection ports is described above, more connection ports can well be incorporated in an Ethernet switch device for practical applications of the apparatus and method of the invention.

What is claimed is:

1. A method of data storing and searching in an address table of an Ethernet switch device, the Ethernet switch device including a central switch and a plurality of device port connecting means connected to the switch, each connecting means including a router, an address table, a port, and a media access controller, and the router including a destination address register and a multiplexer, the method comprising the steps of:

receiving network addressing information in the destination address register from the media access control means and dividing the network addressing information into a plurality of address sections;

receiving the plurality of address sections in the multiplexer from the destination address register and successively multiplexing the received address sections to provide a multiplexed address output;

comparing the multiplexed address output with entries in the address table to find a match address from among address information contained in the entries;

connecting the central switch to the port of one of said plurality of device port connecting means identified by a port number associated with the match address information if a match is found in said step of comparing, and broadcasting the network addressing information to all ports of all of said plurality of device port connecting means if no match address is found in said comparing step.

2. The method of claim 1, wherein the address table stores information according to a data format that includes a plurality of fields including a flag information field and a network address field containing the network addressing information divided into a plurality of sections, wherein said comparing step includes successively comparing each of the plurality of sections in the destination address register with each of the plurality of divided sections of the network addressing information.

3. The method of claim 2, wherein the multiplexer selects the multiplexed output thereof based on flag information contained in the flag information field.

4. The method of claim 3, wherein the plurality of fields of the data format further includes a networking control information field.

5. The method of claim 3, wherein the plurality of fields of the data format further includes a networking age information field.

6. The method of claim 3, wherein said plurality of fields of the data format further includes a networking port number field.

7. An Ethernet switch device, comprising:

central switching means;

a plurality of ports;

means, including respective address tables associated with respective ones of the ports, for independently connecting said central switching means to each of said ports; and means for performing data storage and search in the address tables for determining a connection of said central switch means to one of said ports, said storage and search means including data comparing means for performing a data comparison with data stored in the address tables to obtain network addressing information containing a port number corresponding to a respective one of the ports;

wherein said data comparing means includes for each address table and its corresponding port, a respective media access control means and a respective routing means;

said routing means includes a destination address register and a multiplexer means;

said destination address register is connected to said media access control means for receiving network addressing information and dividing the network addressing information into a plurality of address sections; and said multiplexer means is connected to said destination address register for successively receiving said plurality of address sections from said destination address register and multiplexing the address sections into multiplexed address outputs.

8. The Ethernet switch device of claim 7, wherein said address table stores information according to a data format comprising a plurality of fields including a flag information field and a network address field containing the network addressing information divided into a plurality of sections.

9. The Ethernet switch device of claim 8, wherein the plurality of fields of the data format further includes a networking control field.

10. The Ethernet switch device of claim 8, wherein the plurality of fields of the data format further includes a networking age field.

11. The Ethernet switch device of claim 8, wherein the plurality of fields of the data format further includes a networking port number field.

12. An Ethernet switch device, comprising;

central switching means;

a plurality of ports;

means, including an address table associated with respective ones of the ports, for independently connecting said central switching means to each of said ports; and means for performing data storage and search in the address tables for determining a connection of said central switch means to one of said ports, said storage and search means including data comparing means for performing a data comparison with data stored in the address tables to obtain network addressing information containing a port number corresponding to a respective one of the ports;

wherein said data comparing means includes for the address table and the corresponding ports, a respective media access control means and a routing means;

said routing means includes a destination address register and a multiplexer means;

said destination address register is connected to said media access control means for receiving network addressing information and dividing the network addressing information into a plurality of address sections; and said multiplexer means is connected to said destination address register for successively receiving said plurality of address sections from said destination address register and multiplexing the address sections into multiplexed address outputs.

13. The Ethernet switch device of claim 12, wherein said address table stores information according to a data format comprising a plurality of fields including a flag information field and a network address field containing the network addressing information divided into a plurality of sections.

14. The Ethernet switch device of claim 13, wherein the plurality of fields of the data format further includes a networking control field.

15. The Ethernet switch device of claim 13, wherein the plurality of fields of the data format further includes a networking age field.

16. The Ethernet switch device of claim 13, wherein the plurality of fields of the data format further includes a networking port number field.

17. The Ethernet switch device of claim 12, wherein said data comparing means includes for each address table and its corresponding port, a respective media access control means and a respective routing means, said routing means includes a destination address register and a multiplexer means, wherein said destination address register is connected to said media access control means for receiving network addressing information and dividing the network addressing information into a plurality of address sections; and said multiplexer means is connected to said destination address register for receiving said plurality of address sections from said destination address register successively and multiplexing the address sections into multiplexed address outputs.

* * * * *